US009463446B2

(12) United States Patent
Kwon et al.

(10) Patent No.: US 9,463,446 B2
(45) Date of Patent: Oct. 11, 2016

(54) CARBON DIOXIDE GAS ADSORBENT INCLUDING CHABAZITE ZEOLITE, METHODS FOR PREPARING THE SAME, AND METHODS OF SEPARATING CARBON DIOXIDE USING THE SAME

(71) Applicant: Samsung Electronics Co., Ltd., Suwon-Si, Gyeonggi-Do (KR)

(72) Inventors: Hyuk Jae Kwon, Suwon-si (KR); Soon Chul Kwon, Hwaseong-si (KR); Hyun Chul Lee, Hwaseong-si (KR); Wha Seung Ahn, Incheon (KR); Seung Hwan Hong, Incheon-si (KR)

(73) Assignees: Samsung Electronics Co., Ltd., Gyeonggi-Do (KR); INHA-Industry Partnership Institute, Nam-Gu Incheon (KR)

( * ) Notice: Subject to any disclaimer, the term of this patent is extended or adjusted under 35 U.S.C. 154(b) by 57 days.

(21) Appl. No.: 14/534,501

(22) Filed: Nov. 6, 2014

(65) Prior Publication Data
US 2015/0122124 A1    May 7, 2015

(30) Foreign Application Priority Data

Nov. 6, 2013    (KR) .......................... 10-2013-0134390

(51) Int. Cl.
*B01D 53/02* (2006.01)
*B01J 29/70* (2006.01)
(Continued)

(52) U.S. Cl.
CPC ............ *B01J 29/7015* (2013.01); *B01D 53/02* (2013.01); *B01J 20/186* (2013.01); *B01J 20/28057* (2013.01); *B01J 20/28071* (2013.01); *B01J 20/28083* (2013.01); *B01J 20/3085* (2013.01); *B01J 20/3408* (2013.01); *B01J 20/3483* (2013.01); *C01B 39/46* (2013.01); *B01D 2253/1085* (2013.01); *B01D 2257/504* (2013.01); *B01D 2258/0283* (2013.01); *Y02C 10/08* (2013.01); *Y02P 20/152* (2015.11)

(58) Field of Classification Search
CPC ................ B01D 2253/1085; B01D 2257/504; B01D 2258/0283; B01D 53/02; B01J 20/186; B01J 20/28057; B01J 20/28071; B01J 20/28083; B01J 20/3085; B01J 20/3408; B01J 20/3483; B01J 29/7015; C01B 39/46; Y02C 10/08; Y02P 20/152
See application file for complete search history.

(56) References Cited

U.S. PATENT DOCUMENTS 6,709,644 B2    3/2004    Zones et al.
8,361,200 B2    1/2013    Sayari et al.
(Continued)

OTHER PUBLICATIONS

Kresten Egeblad et al., "Mesoporous zeolite and zeotype single crystals synthesized in fluoride media," Microporous and Mesoporous Materials, vol. 101, Issue 1-2, pp. 214-223, Apr. 19, 2007.

(Continued)

*Primary Examiner* — Christopher P Jones
(74) *Attorney, Agent, or Firm* — Harness, Dickey & Pierce, P.L.C (57) ABSTRACT

A carbon dioxide adsorbent may include a chabazite zeolite containing an alkali metal ion or alkaline earth metal ion. The chabazite zeolite may have a Si/Al mole ratio of about 1 to about 9.9 and mesopores. The carbon dioxide adsorbent may be included in a carbon dioxide capture module. The carbon dioxide adsorbent may also be used in a method of separating carbon dioxide.

20 Claims, 10 Drawing Sheets

(51) Int. Cl.
*C01B 39/46* (2006.01)
*B01J 20/18* (2006.01)
*B01J 20/28* (2006.01)
*B01J 20/30* (2006.01)
*B01J 20/34* (2006.01)

(56) References Cited

U.S. PATENT DOCUMENTS

| | | | |
|---|---|---|---|
| 2003/0069449 A1 | 4/2003 | Zones et al. | |
| 2010/0092383 A1 | 4/2010 | Ying et al. | |
| 2011/0020204 A1* | 1/2011 | Bull | B01D 53/9418 423/239.2 |
| 2011/0165052 A1* | 7/2011 | Beutel | B01D 53/9418 423/239.2 |
| 2012/0244066 A1* | 9/2012 | Bull | B01D 53/9418 423/703 |
| 2012/0258852 A1 | 10/2012 | Martinez et al. | |
| 2014/0251135 A1* | 9/2014 | Kwon | B01J 29/7015 95/106 |

OTHER PUBLICATIONS

Jun Zhang et al., "Alkali and alkaline-earth cation exchanged chabazite zeolites for adsorption based $CO_2$ capture," Microporous and Mesoporous Materials, vol. 111, issue 1-3, pp. 478-487, Apr. 15, 2008.

Linn Sommer et al., "Mesopore formation in zeolite H-SSZ-13 by desilication with NaOH," Microporous and Mesoporous Materials, vol. 132, issue 3, pp. 384-394, Aug. 2010.

* cited by examiner

Comparative Preparation Example 1

Preparation Example 2

Preparation Example 4

Preparation Example 5

CARBON DIOXIDE GAS ADSORBENT INCLUDING CHABAZITE ZEOLITE, METHODS FOR PREPARING THE SAME, AND METHODS OF SEPARATING CARBON DIOXIDE USING THE SAME

CROSS-REFERENCE TO RELATED APPLICATION

This application claims priority under 35 U.S.C. §119 to Korean Patent Application No. 10-2013-0134390, filed in the Korean Intellectual Property Office on Nov. 6, 2013, the entire contents of which are incorporated herein by reference.

BACKGROUND

1. Field

Example embodiments herein relate to a carbon dioxide adsorbent including mesoporous chabazite zeolite, a process for preparing the same, and a method of separating carbon dioxide using the same.

2. Description of the Related Art

A considerable increase in the concentration of global atmospheric $CO_2$, one of the greenhouse gases, has raised concern about climate change, and has led to increasing efforts in research and development on control of $CO_2$ emissions. The main $CO_2$ emission sources include fossil fuel-based power plants, vehicles, and manufacturing plants for cement, limestone, hydrogen, ammonia, and the like.

Capture and separation of carbon dioxide from fixed facilities such as various power plants or factories are considered a first step for the control of $CO_2$ emissions. The capture of carbon dioxide refers to a process of physically or chemically separating $CO_2$ among a gas mixture generated from chemical reactions or combustion of fossil fuels. In order to capture $CO_2$ by adsorption, carbon materials, zeolites, metal-organic composite materials (MOF), or the like may be used. They show a certain level of adsorption efficiency at a low temperature of 0° C. to room temperature, but they have difficulties when used for carbon dioxide adsorption in a higher temperature range. Hydrotalcite shows an adsorption capacity of about 1 to 2 wt % at the temperature range of about from 200 to 300° C. and under a normal pressure, but its adsorption capacity is too low to practically carry out a carbon dioxide adsorption process.

Among fixed $CO_2$-emission facilities emitting a considerable amount of carbon dioxide are fossil fuel-based power plants (e.g., an integrated gasification combined cycle (IGCC) system or a thermoelectric power plant) and natural gas wells. In order to find greater utility in such facilities for the carbon dioxide adsorbent, it may be desired to show enhanced adsorption capacity at a relatively high temperature (e.g., about 200 to 550° C.) and under an elevated pressure.

SUMMARY

Some example embodiments relate to a carbon dioxide adsorbent having an improved adsorption capacity and that is usable in a relatively high temperature range and at a relatively high pressure.

Some example embodiments relate to a process for preparing the carbon dioxide adsorbent.

Some example embodiments relate to a method of separating carbon dioxide that includes using the carbon dioxide adsorbent.

According to one example embodiment, a carbon dioxide adsorbent may include a chabazite zeolite containing an alkali metal ion or alkaline earth metal ion, the chabazite zeolite having a Si/Al mole ratio of about 1 to about 9.9, and including mesopores.

The chabazite zeolite may have a Si/Al mole ratio of about 1 to about 5.

The alkali metal ion or alkaline earth metal ion may include lithium (Li) ion, sodium (Na) ion, potassium (K) ion, barium (Ba) ion, magnesium (Mg) ion, calcium (Ca) ion, or a combination thereof.

The chabazite zeolite may have a chabazite structure obtained by structural transformation by a strong base.

The chabazite zeolite may have an average pore size of about 1 nm to about 10 nm.

The chabazite zeolite may have a mesoporous volume of about 0.05 to about 0.50 $cm^3/g$, as measured by the Barrett-Joyner-Halenda (BJH) method.

The chabazite zeolite may have a BET surface area of greater than or equal to about 50 $m^2/g$.

According to another example embodiment, a process for preparing a carbon dioxide adsorbent (that includes a chabazite zeolite containing an alkali metal ion or alkaline earth metal ion, having a Si/Al mole ratio of about 1 to about 9.9, and including mesopores) may include obtaining a zeolite having a structure other than a chabazite structure (non-chabazite structure) and a Si/Al mole ratio of about 1 to 9.9; adding the zeolite and a surfactant to an aqueous solution of a strong base having an alkali metal ion or alkaline earth metal ion to obtain a mixture; and subjecting the mixture to a hydrothermal treatment to obtain a mesoporous chabazite zeolite including the alkali metal ion or alkaline earth metal ion.

The surfactant may include a cationic surfactant, a non-ionic surfactant, a polymeric surfactant, or a combination thereof.

The process for preparing the carbon dioxide adsorbent may further include exchanging the alkali metal ion or alkaline earth metal ion present in the mesoporous chabazite zeolite with another alkali metal ion or alkaline earth metal ion.

The process for preparing the carbon dioxide adsorbent may include forming the mesoporous chabazite zeolite without using a structure directing agent.

The zeolite having a structure other than the chabazite structure may include faujasite or mordenite.

The zeolite may have a Si/Al mole ratio of about 1 to about 5.

The strong basic compound having the alkali metal or alkaline earth metal ion may include KOH, NaOH, LiOH, $Mg(OH)_2$, $Ca(OH)_2$, $Ba(OH)_2$, or a combination thereof.

The hydrothermal treatment may be conducted at a temperature of greater than or equal to about 80° C. for a period of time of about 30 hours or longer.

According to yet another example embodiment, a method of separating carbon dioxide may include bringing a gas mixture containing carbon dioxide into contact with a carbon dioxide adsorbent. The carbon dioxide adsorbent may include a chabazite zeolite containing an alkali metal ion or alkaline earth metal ion, having a Si/Al mole ratio of about 1 to about 9.9, and having mesopores.

In the method of separating carbon dioxide, the alkali metal ion or alkaline earth metal ion may include a lithium ion, sodium ion, potassium ion, barium ion, magnesium ion, calcium ion, or combination thereof.

In the method of separating carbon dioxide, the Si/Al mole ratio may range from about 1 to about 5.

The method may further include the calcination process (heat treatment) of the carbon dioxide adsorbent at a temperature of about 200° C. to about 500° C., optionally under a reduced pressure, to desorb the carbon dioxide.

The gas mixture may further include at least one gas selected from hydrogen, nitrogen, and methane.

The gas mixture may be in contact with the carbon dioxide adsorbent at a temperature of about 30° C. to about 500° C.

The carbon dioxide adsorbent may adsorb carbon dioxide with a relatively high efficiency even at a relatively high temperature under a relatively high pressure, and the adsorbed carbon dioxide may be easily desorbed therefrom.

DETAILED DESCRIPTION

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Unless specifically mentioned to the contrary, the term "chabazite zeolite" used herein refers to a zeolite having a chabazite crystalline structure.

Unless specifically mentioned to the contrary, the term "input gas stream" used herein refers to a gas stream prior to passing through an adsorbent region or prior to initial contact with an adsorbent.

Unless specifically mentioned to the contrary, the term "mesoporous" refers to having mesopores, for example of a pore size of 2 nm to 50 nm.

A carbon dioxide adsorbent according to an example embodiment may include a chabazite zeolite containing an alkali metal ion or alkaline earth metal ion. The chabazite zeolite may have a Si/Al mole ratio of less than or equal to about 10, for example, about 1 to about 9.9, about 1 to about 6, or about 1 to about 3. The chabazite zeolite may be mesoporous zeolite including mesopores. The alkali metal or alkaline earth metal ion contained in the chabazite zeolite may include lithium (Li) ion, sodium (Na) ion, potassium (K) ion, magnesium (Mg) ion, calcium (Ca) ion, barium (Ba) ion, or combination thereof. The chabazite zeolite may be a zeolite that is prepared by treating a zeolite having a structure other than the chabazite structure with a strong base to be transformed into a zeolite having a chabazite structure. Examples of the zeolite having a structure other than the chabazite structure include, but are not limited to, a zeolite having a faujasite structure such as zeolite X or zeolite Y, mordenite, and zeolite A.

Zeolite may show a certain level of adsorption capacity for carbon dioxide in a low temperature range of 100° C. or lower, but it shows a poor adsorption capacity at a high temperature. However, when the zeolite has a chabazite structure resulting from transformation by a strong base and contains an alkali metal ion or an alkaline earth metal ion therein, it may have an increased level of its adsorption capacity (for example, of greater than or equal to about 5 wt %) at a relatively high temperature of 120° C.

Without wishing to be bound by a certain theory, the increase in the adsorption capacity at such a high temperature may result from the fact that the changes in the crystalline structure (such as the transformation from a faujasite crystalline structure to a chabazite crystalline structure) bring forth the generation of new adsorption sites for carbon dioxide. The increase may also result from the fact that a chabazite structure having smaller pores than that of zeolite Y having larger pores is advantageous in the carbon dioxide adsorption. However, in case of the chabazite zeolite having only micro-pores, its adsorption capacity at a high pressure is similar to the adsorption capacity at a normal pressure. The adsorption capacity may have to show an increased level of adsorption capacity at a higher pressure, but in case of the chabazite zeolite having only the micropores (for example, having a pore size of less than or equal to 1 nm such as 0.3 nm to 0.4 nm), substantially no increase may be achieved as the pressure increases.

Without wishing to be bound by any theory, a chabazite zeolite may have well-developed micro-pores, and such fine pores may act as a limiting factor for the diffusion of gas molecules and thereby hamper the flow of the gas flow. By contrast, the mesoporous chabazite zeolite of the aforementioned embodiment that has an alkali metal ion or alkaline earth metal ion may exhibit a significantly enhanced adsorption capacity as the pressure increases. Without wishing to be bound by any theory, it is believed that the mesoporous chabazite zeolite has micropores together with mesopores and such changes in the pore size may cause an increase in mobility of the gas molecules, and thereby, under a higher pressure, a larger number of molecules may stay in pores having an increased size, resulting in the increase of the adsorption capacity at a higher pressure. The carbon dioxide adsorbent including the aforementioned mesoporous chabazite zeolite may have a great potential of being utilized for natural gas wells and fossil fuel-based power plants, (e.g., an integrated gasification combined cycle (IGCC) system) wherein the adsorption of the carbon dioxide should be accomplished at a higher pressure (for example, of greater than or equal to about 20 atm).

The mesoporous chabazite zeolite may have a specific surface area of greater than or equal to about 50 $m^2/g$, for example, of about 70 $m^2/g$ to about 300 $m^2/g$, as determined by the BET method. The mesoporous chabazite zeolite may have an average pore size of about 1 nm to about 10 nm, for example, about 2 nm to about 10 nm. In non-limiting examples, the mesoporous chabazite zeolite may have a maximum peak in a range of about 3 nm to about 4 nm in a pore size distribution curve. The mesoporous chabazite zeolite may have a volume of mesopores of about 0.05 $cm^3/g$ to about 0.50 $cm^3/g$, as measured by the (Barrett-Joyner-Halenda) BJH method. The mesoporous chabazite zeolite may have a pore volume of about 0.06 $cm^3/g$ to about 0.2 $cm^3/g$. Within the aforementioned ranges, the adsorption capacity at a high pressure may be further enhanced.

In another example embodiment, a process for preparing a carbon dioxide adsorbent including zeolite includes obtaining a zeolite having a structure other than a chabazite structure and a Si/Al mole ratio of about 1 to about 9.9, adding the zeolite and a surfactant to an aqueous solution of a strong base having an alkali metal ion or alkaline earth metal ion to obtain a mixture, and subjecting the mixture to a hydrothermal treatment to obtain a (e.g., mesoporous) chabazite zeolite that contains the alkali metal ion or alkaline earth metal ion and includes mesopores.

The process for preparing the carbon dioxide adsorbent may further include exchanging the alkali metal ion or alkaline earth metal ion in the mesoporous chabazite zeolite with another alkali metal ion or alkaline earth metal ion.

The process for preparing the carbon dioxide adsorbent may further include separating the mesoporous chabazite zeolite containing the (ion-exchanged) alkali metal ion or the alkaline earth metal ion.

The zeolite having a structure other than the chabazite structure may include faujasite or mordenite. For example, the Si/Al mole ratio may range from about 1 to about 6, or from about 1 to about 3. Specific examples of the zeolite having a structure other than the chabazite structure may include, but are not limited to, zeolite X, zeolite Y, mordenite, and zeolite A. The zeolite having a structure other than the chabazite structure may be synthesized in accordance with any known synthesis method, or it is commercially available.

In the prior arts, synthesis of the chabazite zeolite entails using an expensive structure directing agent (SDA) or making a non-commercialized SDA and using the same. However, in the aforementioned process, it becomes possible to obtain a chabazite zeolite from a zeolite having a structure other than the chabazite zeolite without using any structure directing agent. The zeolite having a structure other than the chabazite structure is added to an aqueous solution of a strong base containing an alkali metal ion or alkaline earth metal ion, and the resulting mixture is subjected to a hydrothermal treatment to produce a chabazite zeolite via structural transformation. The strong base having the alkali metal ion or alkaline earth metal ion may include KOH, NaOH, LiOH, $Ca(OH)_2$, $Mg(OH)_2$, $Ba(OH)_2$, or a combination thereof.

The amount of the zeolite being added to the aqueous solution of the strong base may be appropriately selected and is not particularly limited. The pH of the aqueous solution of the strong base containing the alkali metal or alkaline earth metal ion may be greater than or equal to about 12, for example greater than or equal to about 13, or greater than or equal to about 14. The aforementioned pH range may facilitate the transformation into the chabazite structure. The hydrothermal treatment may be conducted at a temperature of greater than or equal to about 80° C., for example from about 90° C. to 110° C., for a period of time of about 30 hours or longer, for example about 36 hours or longer, or about 3 days or longer, about 4 days or longer, about 5 days or longer, or about 6 days or longer.

In addition, such a structural transformation is conducted in the presence of the surfactant so that the chabazite zeolite thus obtained may include many mesopores in a range of about 2 nm to 50 nm, having mesoporosity. In other words, the mesoporous chabazite zeolite has a volume of mesopores of about 0.05 cm$^3$/g to 0.50 cm$^3$/g, for example, about 0.05 cm$^3$/g to about 0.20 cm$^3$/g. As stated above, due to the presence of the mesopores, the mesoporous chabazite zeolite may exhibit a significantly increased adsorption capacity of carbon dioxide at a high pressure.

The surfactant may include a cationic surfactant, a non-ionic surfactant, a polymeric surfactant, or a combination thereof. The surfactant may be at least one alkyl trimethyl ammonium salt, at least one dialkyldimethyl ammonium salt, an alkyl trimethyl ammonium halide, an alkyl amine compound, an alkyl carboxylic acid compound, or a combination thereof. Examples of the cationic surfactant may include, but are not limited to, cetyl trimethyl ammonium bromide (CTAB), cetyl trimethyl ammonium chloride (CTAC), 3-(trimethoxysilyl) propyl octadecyl dimethyl ammonium chloride (TPOAC), and the like. Examples of the non-ionic surfactant may include, but are not limited to, ethoxy linear alcohols, amine- and amide-based materials, fatty acid esters, and the like. Examples of the polymeric surfactant may include, but are not limited to, block copolymers consisting of polyethylene oxide (PEO)-polypropylene oxide (PPO)-polyethylene oxide (PEO). The amount of the surfactant being used may be appropriately selected in light of maintaining the structure, for example, the hydrothermal stability, and the like. For example, the surfactant may be used in an amount of less than or equal to about 10% by weight, for example, about 3% by weight to about 8% by weight, based on the weight of the zeolite, but it is not limited thereto.

The chabazite zeolite obtained from such hydrothermal treatment contains an alkali metal or alkaline earth metal ion derived from the strong base, and the alkali metal or alkaline earth metal ion may be further replaced with a Li$^+$, Na$^+$, K$^+$, Mg$^{2+}$, Ba$^{2+}$, or Ca$^{2+}$ ion via an additional ion-exchange process. The ion-exchange process may include contacting the chabazite zeolite thus obtained with a solution containing a salt compound having a desired cation. Examples of the salt compound may include, but are not limited to, chloride, halides, acetate, nitrate, and sulfate. The contacting may include a hydrothermal treatment. The hydrothermal treatment for the ion exchange may be conducted at a temperature of greater than or equal to about 60° C. for about 2 hours or longer, for example, at a temperature of greater than or equal to about 70° C. for about 5 hours to 24 hours, but it is not limited thereto. The amount of the salt compound being used is not particularly limited, and may be appropriately selected in light of the ion-exchange rate.

Separating the chabazite zeolite containing the (ion-exchanged) alkali metal or alkaline earth metal ion may be carried out in a suitable manner. By way of an example, the separation may include filtration, centrifugation, and the like. The separated chabazite zeolite may be subjected to washing and drying. The washing may be carried out using water (e.g., distilled water). The drying may be conducted at a temperature of greater than or equal to about 80° C., but the drying conditions are not particularly limited.

In another example embodiment, the method of separating carbon dioxide may include contacting a gas mixture including carbon dioxide with a carbon dioxide adsorbent including a chabazite zeolite, the chabazite zeolite containing an alkali metal or alkaline earth metal ion, having a Si/Al mole ratio of about 1 to about 9.9, and including mesopores.

Details of the carbon dioxide adsorbent may be the same as set forth above. The gas mixture including carbon dioxide may be an input gas stream including carbon dioxide. Besides carbon dioxide, the gas mixture may further include hydrogen, a hydrocarbon, nitrogen, or a combination thereof. The carbon dioxide adsorbent may be brought into contact with the gas mixture at a temperature of greater than or equal to about 25° C., and for example, about 30° C. to about 400° C. The carbon dioxide adsorbent may exhibit a high level of adsorption capacity not only at a low temperature but also at a relatively high temperature of about 120° C. to 400° C.

The method of separating carbon dioxide may further include heat-treating the carbon dioxide adsorbent at a temperature of about 50° C. to about 700° C. under a reduced pressure to desorb carbon dioxide, and emitting the same. The desorption pressure is not particularly limited, but is in a range of less than or equal to about 1000 Pa, and specifically about 700 Pa to about 50 Pa, for example, about 100 Pa.

Figure 9:
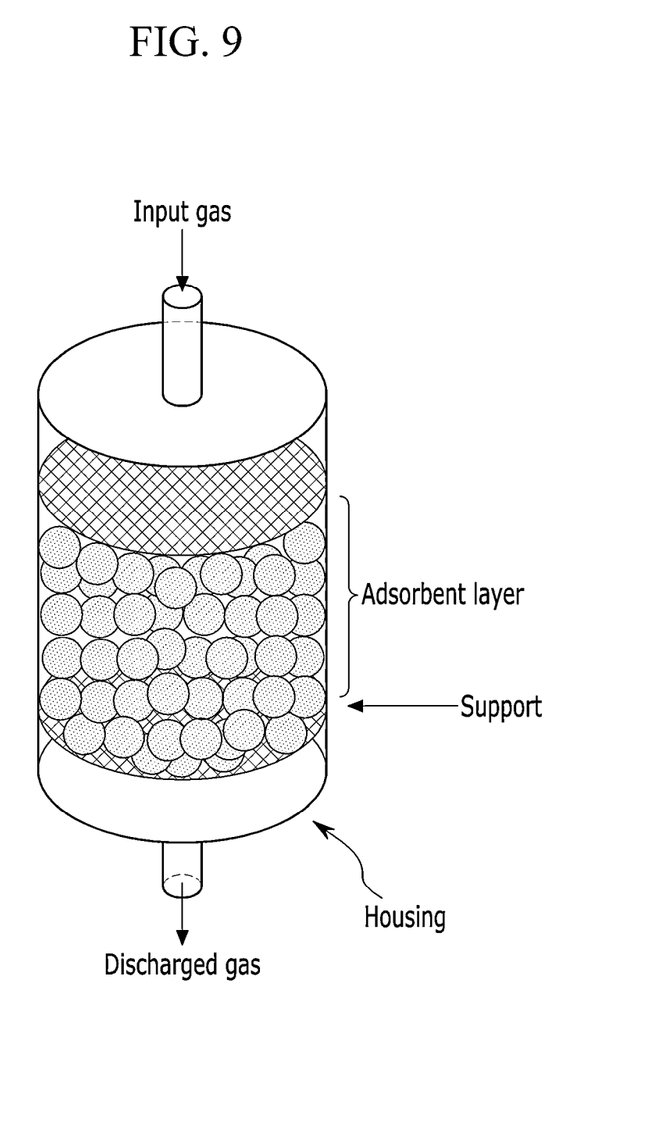
FIG. 9 illustrates a schematic view of a carbon dioxide capture module according to an example embodiment.

The carbon dioxide adsorbent may be used in the form of a carbon dioxide capture module. In a non-limiting example as shown in FIG. 9, the carbon dioxide capture module includes an adsorbent/adsorption layer including the carbon dioxide adsorbent, a support plate holding the adsorption layer, and a housing including an inlet for an input gas stream and an outlet for the treated gas stream. Details for the carbon dioxide adsorbent may be the same as set forth above. The thickness of the adsorption layer is not particularly limited, but may be greater than or equal to about 0.2 cm, and specifically from about 0.5 cm to about 3 cm. The support plate may be made of any materials as long as it may support the adsorbent while allowing the flow of the input gas. Examples of the material may include quartz wool or the like. Materials and shapes of the housing for the module are not particularly limited, but may be selected as needed. By way of non-limiting examples, the housing may be made of stainless steel, copper pipe, or quartz pipe, and may have a shape of cylinder, a prism, a square column, or the like.

The input gas stream may further include at least one gas selected from hydrogen, nitrogen, and hydrocarbons (e.g., methane). The composition of the input gas stream is not particularly limited, but may be appropriately selected as needed. For example, the input gas stream may include carbon dioxide and nitrogen like in a flue gas generated from a fossil fuel power plant. The input gas stream may include carbon dioxide and hydrogen like in a flue gas generated from an integrated gasification combined cycle (IGCC) power plant. The input gas stream may include carbon dioxide and methane like in a gas generated from a natural gas well. The flow rate of supplying the input gas stream is not particularly limited, but may be appropriately selected as desired. For example, the flow rate may be less than or equal to about 1000 ml/min, and specifically, less than or equal to about 500 ml/min.

As set forth above, the carbon dioxide adsorbent may exhibit a high level of adsorption capacity even at a high temperature, and significantly increased (for example by at least double) adsorption capacity under a high pressure.

The following illustrate various embodiments of the present disclosure in more detail. However, it should be understood that the following are merely examples of the present disclosure, and this disclosure is not limited thereto.

EXAMPLES

Preparation Example 1

6.7 cc of an aqueous solution of KOH (9.5 M) is diluted with water to prepare a KOH aqueous solution (45%). To the KOH aqueous solution (pH=14), 6.25 g of zeolite Y (purchased from Sigma Aldrich, trade name: Y Zeolite, Si/Al=1.72) is added while stirring, and then 1.4 g of 3-(trimethoxysilyl)propyl octadecyl dimethyl ammonium chloride (TPOAC) (3%) is added thereto to obtain a mixture. The resulting mixture is heated to 368 K for 15 days to react. The reaction mixture is cooled to room temperature and is filtered to obtain a solid product, which is then washed with water 3 times and dried in air at a temperature of 100° C. for 12 hours to obtain mesoporous chabazite zeolite.

Preparation Example 2

Mesoporous chabazite zeolite is obtained in the same manner as set forth in Preparation Example 1, except adding 2.3 g of 3-(trimethoxysilyl)propyl octadecyl dimethyl ammonium chloride (TPOAC) (5%).

Preparation Example 3

Mesoporous chabazite zeolite is obtained in the same manner as set forth in Preparation Example 1, except adding 4.7 g of 3-(trimethoxysilyl)propyl octadecyl dimethyl ammonium chloride (TPOAC) (10%).

Preparation Example 4

Chabazite zeolite (gram) prepared in Preparation Example 1 is added to a 1 M aqueous solution of sodium chloride (ml) at a ratio of 1 (gram of chabazite):40 (ml of the solution). The resulting mixture is heated to 343 K for 12 hours during the conducting ion-exchange process. The ion-exchanged product is filtered and added to the aqueous solution of sodium chloride to repeat such ion exchange process of 4 times. After the ion-exchange process, the resulting product is washed with water 3 times, and dried at a temperature of 100° C. in air for 12 hours to obtain a Na-substituted mesoporous chabazite zeolite.

Preparation Example 5

A Ca-substituted mesoporous chabazite zeolite is obtained in the same manner as set forth in Preparation Example 4, except that the mesoporous chabazite zeolite prepared in Preparation Example 2 is subjected to an ion-exchange process using a 1 M aqueous solution of calcium chloride.

Comparative Preparation Example 1

6.7 cc of an aqueous solution of KOH (9.5 M) is diluted with water to prepare a KOH aqueous solution (45%). To the KOH aqueous solution (pH=14), 6.25 g of zeolite Y (purchased from Sigma Aldrich, trade name: Y Zeolite, Si/Al=1.72) is added while stirring, and the resulting mixture is heated to 368 K for 15 days to react. The reaction mixture is cooled to room temperature and is filtered to obtain a solid product, which is then washed with water 3 times and dried in air at a temperature of 100° C. for 12 hours to obtain chabazite zeolite.

Comparative Preparation Example 2

Chabazite zeolite (gram) prepared in Preparation Example 1 is added to a 1 M aqueous solution of sodium chloride (ml) at a ratio of 1 (gram of zeolite):40 (ml of the solution). The resulting mixture is heated to 343 K for 12 hours during the conducting ion-exchange process. The ion-exchanged product is filtered and added to the aqueous solution of sodium chloride to repeat such ion exchange process of 4 times. After the ion-exchange process, the resulting product is washed with water 3 times, and dried at a temperature of 100° C. for 12 hours to obtain a Na-substituted chabazite zeolite.

Comparative Preparation Example 3

A Ca-substituted chabazite zeolite is obtained in the same manner as set forth in Comparative Preparation Example 2, except that the Na-substituted chabazite zeolite prepared in Comparative Preparation Example 1 is subjected to an ion-exchange process using a 1 M aqueous solution of calcium chloride.

Experimental Example 1

X-Ray Diffraction Analysis

Figure 1:
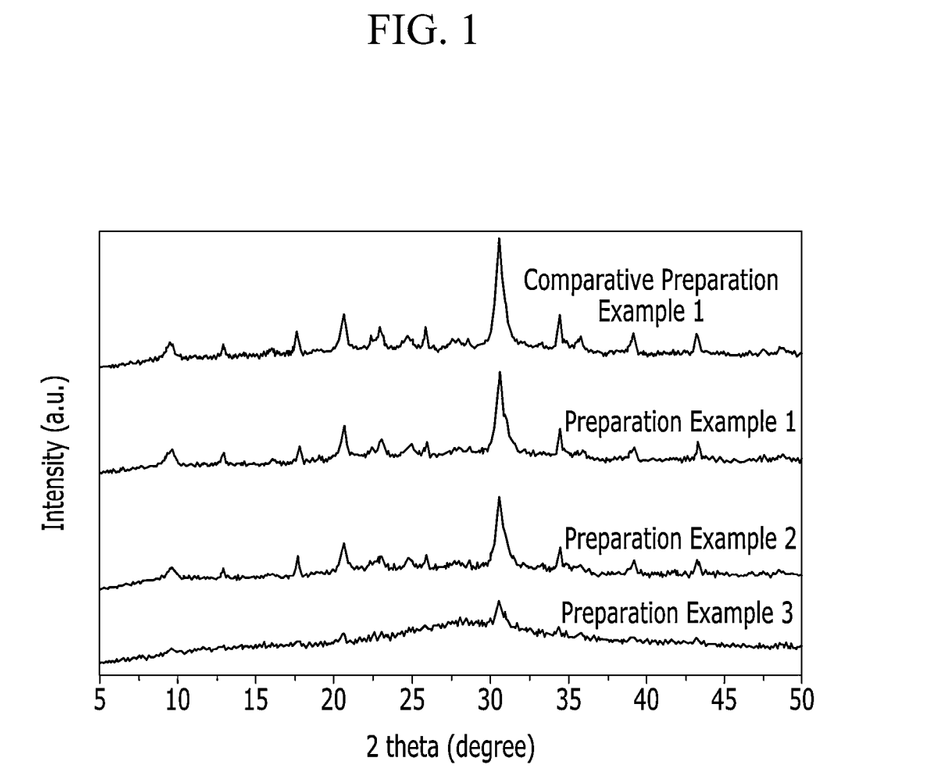
FIG. 1 shows X-ray diffraction spectra of the chabazite zeolite prepared in Preparation Example 1, Preparation Example 2, Preparation Example 3, and Comparative Preparation Example 1.

X-ray diffraction (XRD) analysis is employed for the carbon dioxide adsorbent including the mesoporous chabazite zeolite prepared in Preparation Examples 1, 2, and 3, and the chabazite zeolite prepared in Comparative Preparation Example 1, and the results are shown in FIG. 1. The X-ray diffraction analysis is performed using a Cu Kα ray as a light source, and is operated at 40 kV and 40 mA at a scan speed of 0.005° per second. The results of FIG. 1 confirm that all the zeolites of Preparation Examples 1, 2, and 3 and Comparative Example 1 have a chabazite crystalline structure.

Experimental Example 2

TEM Analysis

Figure 10:
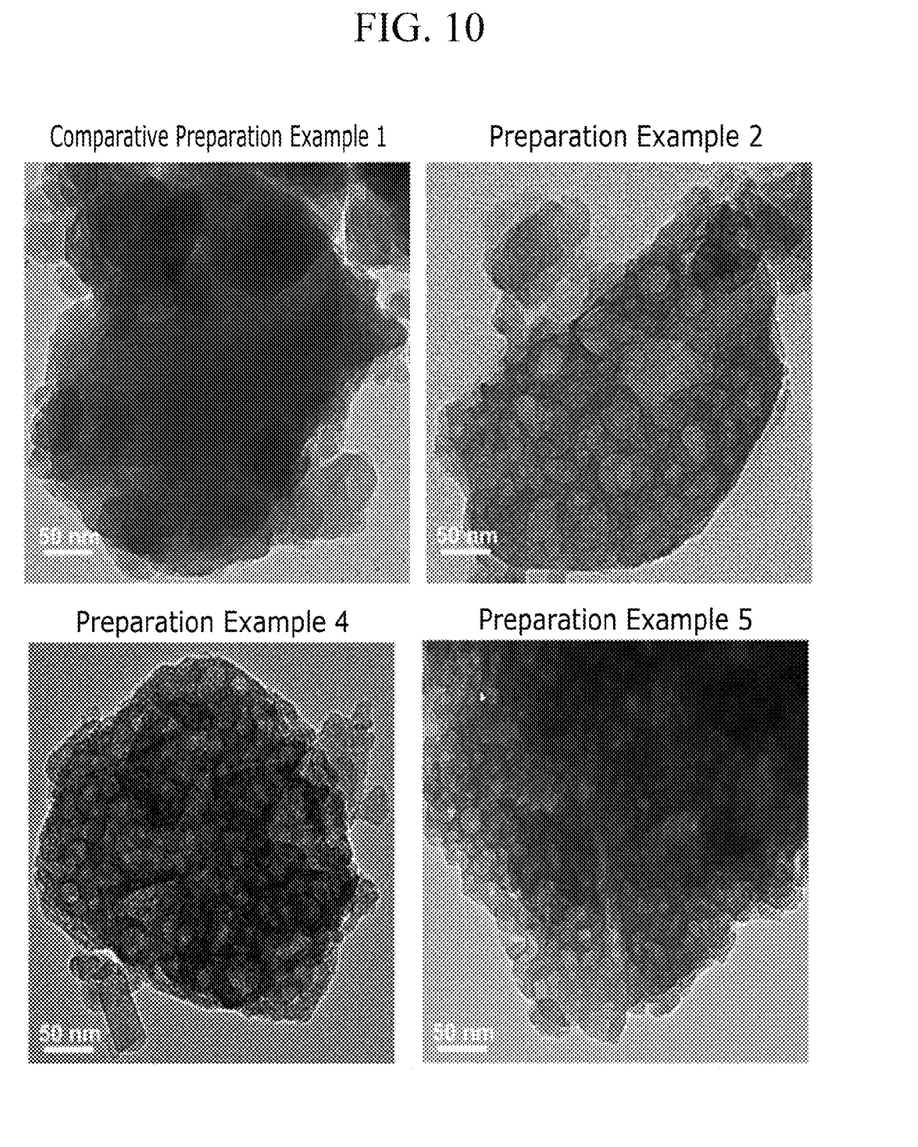
FIG. 10 shows the TEM images for the chabazite zeolite of Comparative Preparation Example 1, Preparation Example 2, Preparation Example 4, and Preparation Example 5.

Using a transmission electron microscope (manufactured by JEOL, model name: JEM-2100F), a TEM analysis is employed for the mesoporous zeolite of Preparation Examples 1 to 4 and the zeolite of Comparative Example 1. Results are shown in FIG. 10, which confirm the formation of the mesopores.

Experimental Example 3

Measurement of Specific Surface Areas

Figure 2:
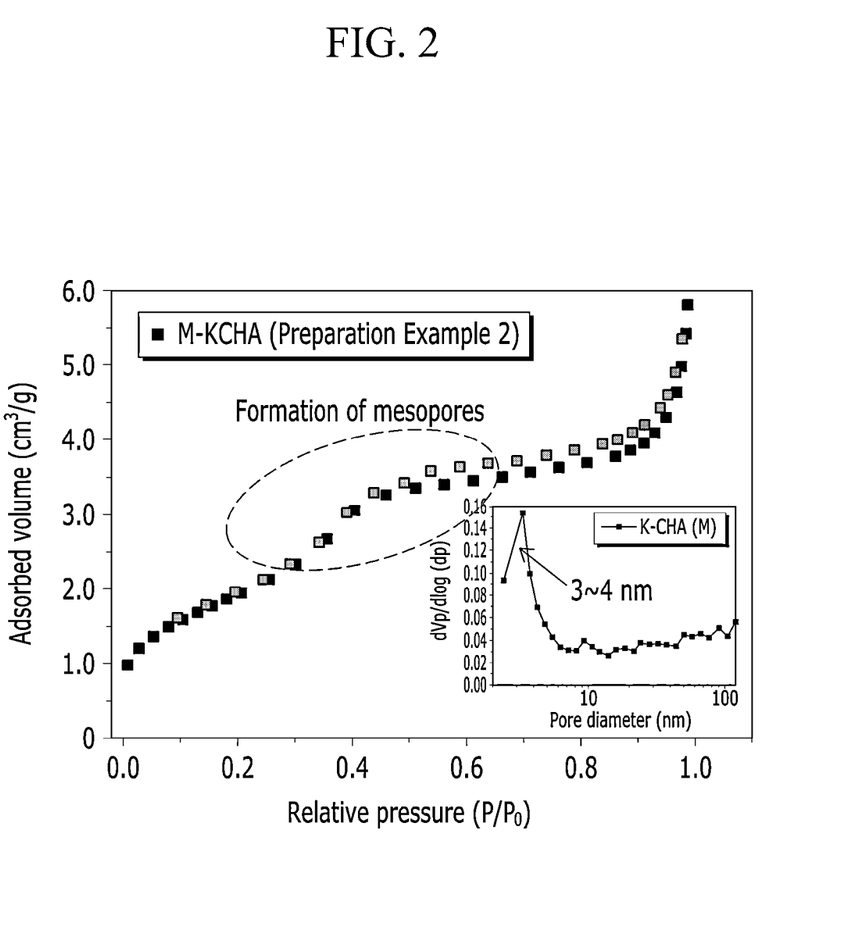
FIG. 2 is a view illustrating the results of a nitrogen isothermal adsorption experiment for the mesoporous chabazite zeolite prepared in Preparation Example 2, and the inset is a view showing a distribution of pore sizes thereof.
Figure 3:
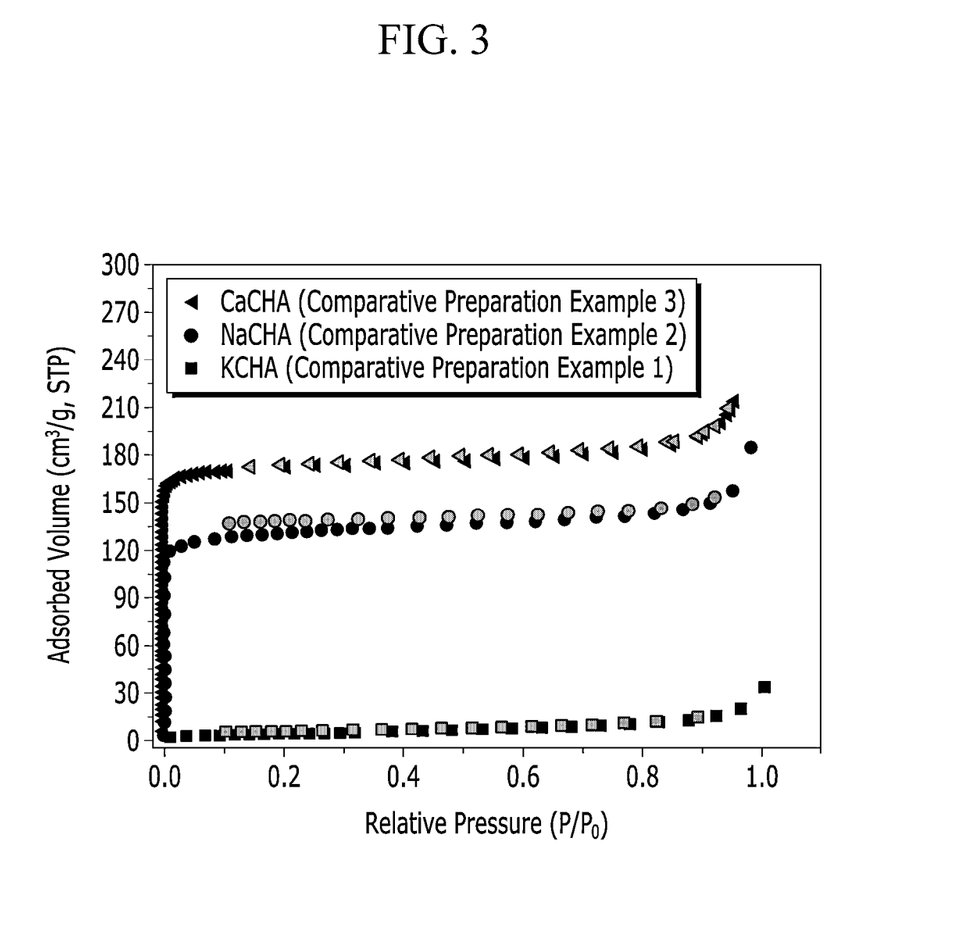
FIG. 3 illustrates the results of nitrogen isothermal adsorption/desorption tests for the chabazite zeolites prepared in Comparative Preparation Examples 1 to 3 in terms of the adsorption volume versus the relative pressure.

Adsorption/desorption isotherm curves of Preparation Examples 1 to 5 and Comparative Preparation Examples 1 to 3 are obtained by conducting a nitrogen adsorption/desorption isothermal reaction with using Bell SorpMax instrument (manufactured by Bell Japan Co. Ltd.). The nitrogen adsorption/desorption curves for the zeolite of Preparation Example 2 is shown in FIG. 2. The nitrogen adsorption/desorption curves for the zeolite of Comparative Preparation Examples 1 to 3 are shown in FIG. 3. The BET specific surface areas, pore volumes, and BJH mesopore volumes of the zeolites of Preparation Examples 1 to 5 and the zeolite of Comparative Preparation Examples 1 are calculated from the results of the nitrogen adsorption/desorption isotherm experiments and compiled in Table 1.

TABLE 1

| Sample | $S_{BET}$ (m²/g) | $V_{pore}$ (cm³/g) | $V_{meso}$ (cm³/g) |
|---|---|---|---|
| Comparative Preparation Example 1 | 17 | 0.045 | — |
| Preparation Example 1 M-KCHA (3%) | 54 | 0.064 | 0.057 |
| Preparation Example 2 M-KCHA (5%) | 73 | 0.100 | 0.087 |
| Preparation Example 3 M-KCHA (10%) | 70 | 0.077 | 0.068 |
| Preparation Example 4 M-NaCHA | 154 | 0.1801 | 0.1353 |
| Preparation Example 5 M-CaCHA | 200 | 0.2046 | 0.1821 |
| Zeolite Y (Na-Y) | 950 | — | — |

The results of FIG. 1, FIG. 2, and Table 1 confirm that the chabazite zeolites prepared in Preparation Examples 1 to 5 are mesoporous chabazite zeolite including mesopores. In contrast, the chabazite zeolites of Comparative Preparation Examples 1 to 3 do not include mesopores. In comparison with zeolite Y prior to being treated with the strong base and the surfactant, the mesoporous chabazite zeolite of Preparation Examples 1 to 5 is confirmed to have a significantly reduced specific surface area.

Experimental Example 4

Figure 4:
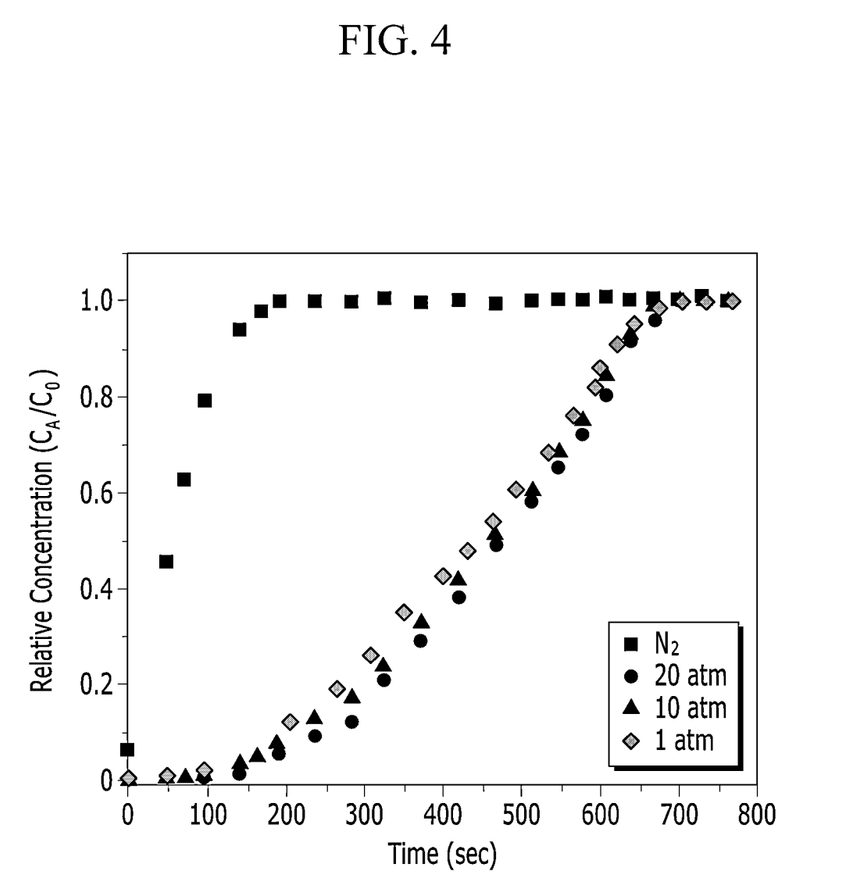
FIG. 4 illustrates the results of a $CO_2$ breakthrough test at a temperature of 25° C. for a carbon dioxide adsorbent of Comparative Example 1 in terms of a relative concentration versus time.
Figure 5:
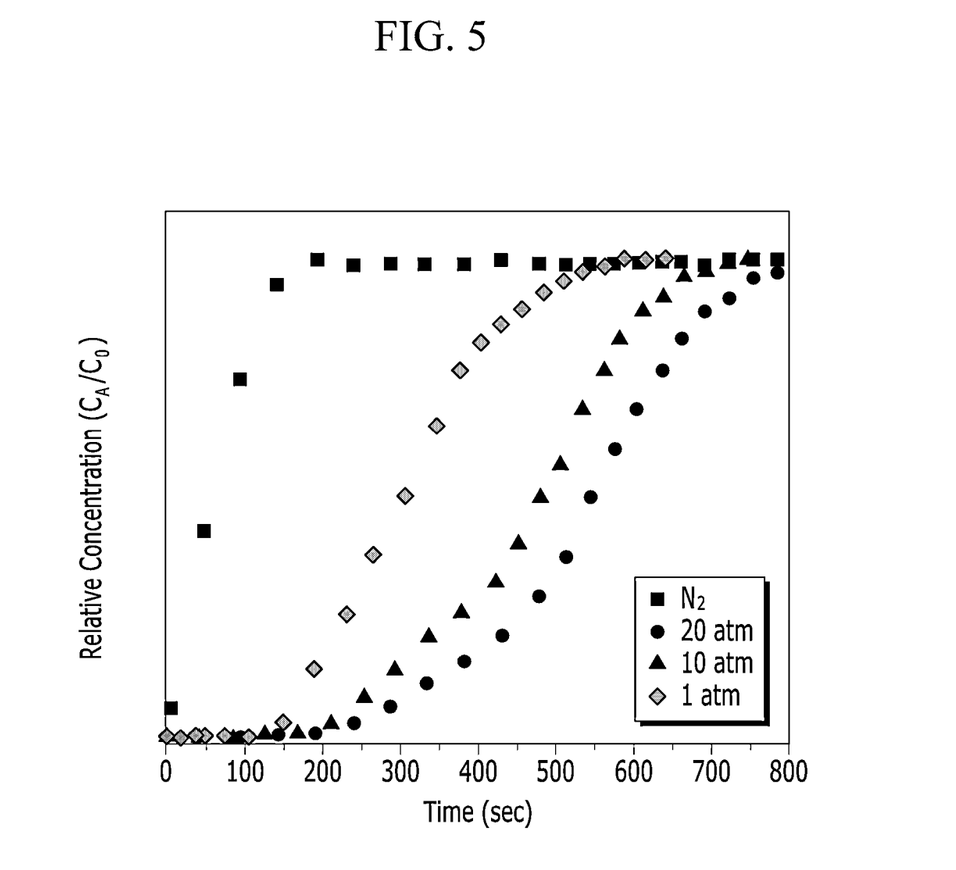
FIG. 5 illustrates the results of a $CO_2$ breakthrough test at a temperature of 25° C. for a carbon dioxide adsorbent of Example 1.
Figure 6:
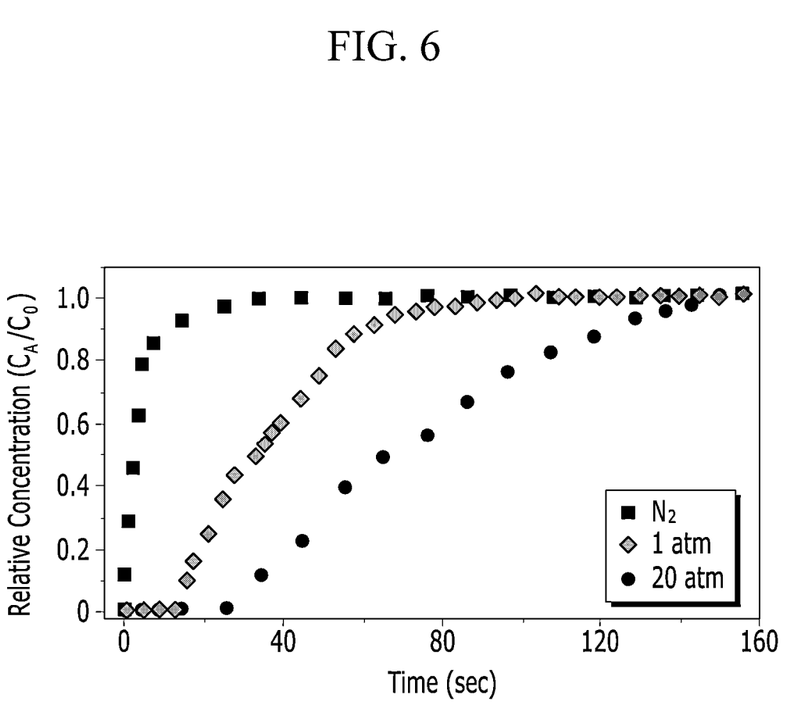
FIG. 6 illustrates the results of a $CO_2$ breakthrough test at a temperature of 200° C. for a carbon dioxide adsorbent of Example 1.
Figure 7:
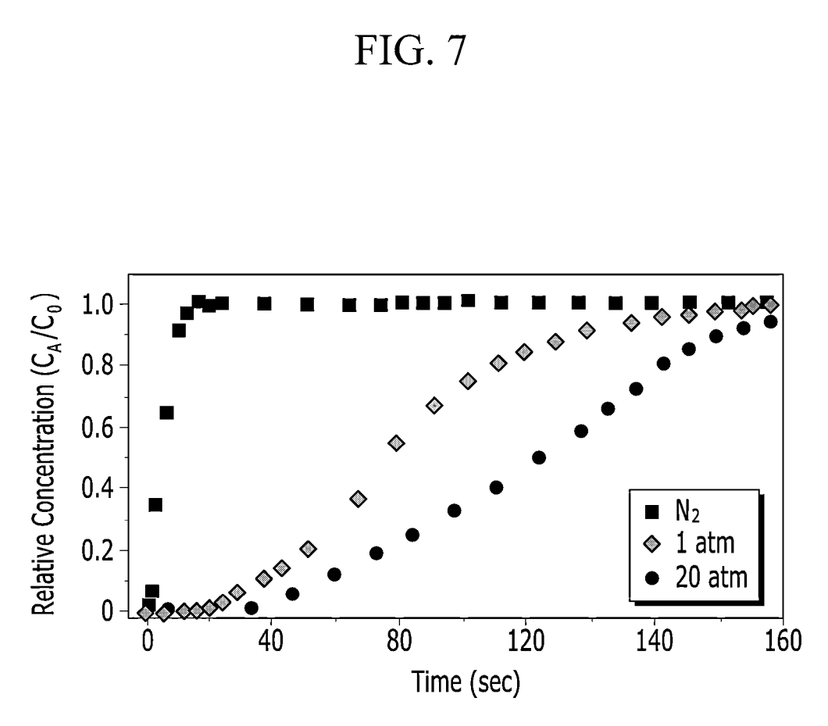
FIG. 7 illustrates the results of a $CO_2$ breakthrough test at a temperature of 200° C. for a carbon dioxide adsorbent of Example 2.
Figure 8:
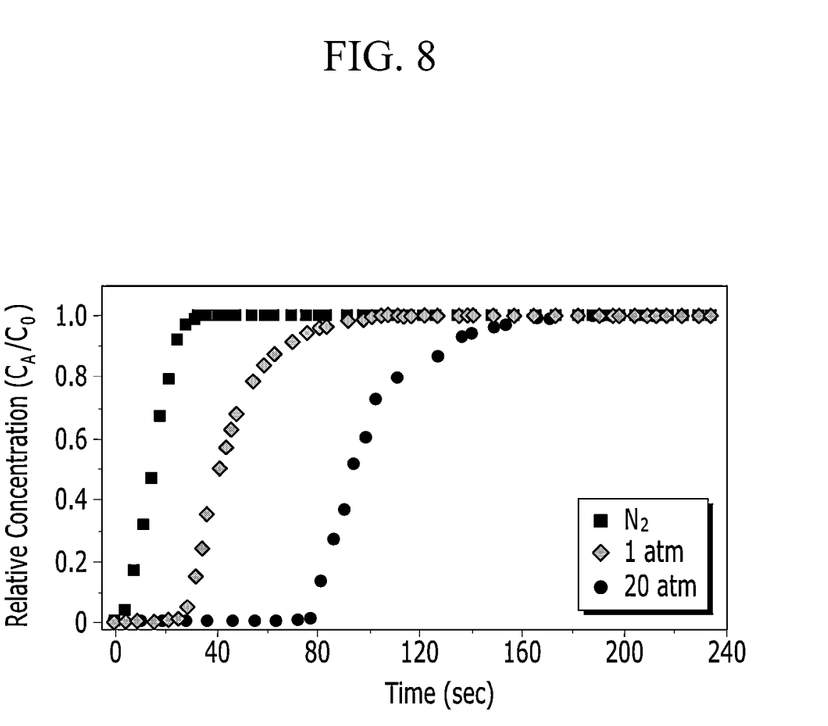
FIG. 8 illustrates the results of a $CO_2$ breakthrough test at a temperature of 200° C. for a carbon dioxide adsorbent of Example 3.

Evaluation of Adsorption Capacity of Carbon Dioxide Adsorbent Including Mesoporous Chabazite Zeolite $CO_2$ breakthrough tests are conducted under the following conditions using a carbon dioxide adsorbent (Example 1) including the mesoporous zeolite of Preparation Example 2, a carbon dioxide adsorbent (Example 2) including the mesoporous zeolite of Preparation Example 4, a carbon dioxide adsorbent (Example 3) including the mesoporous zeolite of Preparation Example 5, and a carbon dioxide adsorbent (Comparative Example 1) including the mesoporous zeolite of Comparative Preparation Example 1, and the results are shown in FIG. 4 (for Comparative Example 1), FIG. 5 (for Example 1 at 25° C.) and FIG. 6 (For Example 1 at 200° C.), FIG. 7 (for Example 2 at 200° C.), and FIG. 8 (for Example 3 at 200° C.).

Gas Composition: 30% $CO_2$/70% $N_2$

Temperature: 25° C. and/or 200° C.

The results of the adsorption capacity depending on the pressure (the results of the isothermal test and TGA test) are listed in Table 2.

In the isothermal test, the adsorption capacity is evaluated as below.

As in the measurement of BET surface area, changes in the concentration of $CO_2$ are measured at a given pressure using $CO_2$ adsorption equilibrium while increasing the relative pressure, and from the results thereof, the total adsorption amount is calculated.

In the TGA tests, the adsorption capacity is evaluated as below.

Considering the initial weight of the adsorbent, the weight increase due to the $CO_2$ adsorption is calculated.

TABLE 2

| | CO2 Adsorbent Samples | Isothermal test 25° C. 1 atm | Breakthrough 25° C. 1 atm | Breakthrough 25° C. 10 atm | Breakthrough 25° C. 20 atm | TGA test 200° C. 1 atm | Breakthrough 200° C. 1 atm | Breakthrough 200° C. 20 atm |
|---|---|---|---|---|---|---|---|---|
| Mesoporous | Example 1 (KCHA) | 11% | 11% | 14.9% | 16% | 1.2% | 1.2% | 3% |
| | Example 2 (NaCHA) | 14.5% | 15.3% (15.6) | — | 22.9% (24.4) | 2.2% | 2% | 4.5% |
| | Example 3 (CaCHA) | 16.6% | — | — | — | 2.7% | 2.7% | 6.2% |
| Microporous | Comp. Example 1 (KCHA) | 15% | 14% | 14.2% | 14.3% | 1.5% | 1.5% | 2% |
| | Comp. Example 2 (NaCHA) | 21.5% | 20.7% (21.0) | — | 21.5% (22.1) | 3.3% | 3.3% | 3.6% |
| | Comp. Example 3 (CaCHA) | 22.5% | — | — | — | 4.8% | 4.6% | 4.8% |

From the results of Table 2 and FIG. 4, in case of the carbon dioxide adsorbent of Comparative Example 1, the pressure increase does not result in an increase in adsorption capacity. By contrast, the results of FIG. 5, FIG. 6, FIG. 7, and FIG. 8 confirm that the $CO_2$ adsorbent of Examples 1 to 3 including the mesoporous chabazite zeolite makes it possible to achieve a significant increase in the adsorption capacity as the pressure increases, thereby realizing a high level of adsorption capacity of at least 6% even at a high temperature of 200° C. by using the zeolite.

While various examples are discussed herein, it should be understood that the present disclosure is not limited thereto, but, on the contrary, is intended to cover various modifications and equivalent arrangements included within the spirit and scope of the appended claims.

What is claimed is:

1. A carbon dioxide adsorbent comprising:
   a chabazite zeolite containing an alkali metal ion or alkaline earth metal ion, the chabazite zeolite having a Si/Al mole ratio of about 1 to about 9.9, the chabazite zeolite having mesopores.
2. The carbon dioxide adsorbent of claim 1, wherein the Si/Al mole ratio is about 1 to about 5.
3. The carbon dioxide adsorbent of claim 1, wherein the alkali metal ion or alkaline earth metal ion comprises a lithium (Li) ion, sodium (Na) ion, potassium (K) ion, barium (Ba) ion, magnesium (Mg) ion, calcium (Ca) ion, or a combination thereof.

4. The carbon dioxide adsorbent of claim 1, wherein the chabazite zeolite has a chabazite structure resulting from structural transformation using a strong base.

5. The carbon dioxide adsorbent of claim 1, wherein the chabazite zeolite has an average pore size of about −1 nm to about 10 nm.

6. The carbon dioxide adsorbent of claim 1, wherein a volume of the mesopores in the chabazite zeolite is about 0.05 to about 0.50 $cm^3/g$ as measured by the Barrett-Joyner-Halenda (BJH) method.

7. The carbon dioxide adsorbent of claim 1, wherein the chabazite zeolite has a BET surface area of greater than or equal to about 50 $m^2/g$.

8. A process for preparing a carbon dioxide adsorbent including a chabazite zeolite containing an alkali metal ion or alkaline earth metal ion, the chabazite zeolite having a Si/Al mole ratio of about 1 to about 9.9, the chabazite zeolite having mesopores, the process comprising:
    obtaining a zeolite having a non-chabazite structure, the zeolite having a Si/Al mole ratio of about 1 to 9.9;
    adding the zeolite and a surfactant to an aqueous solution of a strong base having an alkali metal ion or alkaline earth metal ion to obtain a mixture; and
    subjecting the mixture to a hydrothermal treatment to obtain a mesoporous chabazite zeolite including the alkali metal ion or alkaline earth metal ion.

9. The process for preparing a carbon dioxide adsorbent of claim 8, wherein the surfactant comprises a cationic surfactant, a non-ionic surfactant, a polymeric surfactant, or a combination thereof.

10. The process for preparing a carbon dioxide adsorbent of claim 8, wherein the surfactant is added in an amount of about 3% by weight to about 10% by weight based on the weight of the zeolite.

11. The process for preparing a carbon dioxide adsorbent of claim 8, wherein the chabazite zeolite has a chabazite structure formed without using a structure directing agent.

12. The process for preparing a carbon dioxide adsorbent of claim 8, further comprising:
    exchanging the alkali metal ion or alkaline earth metal ion contained in the chabazite zeolite with another alkali metal ion or alkaline earth metal ion.

13. The process for preparing a carbon dioxide adsorbent of claim 8, wherein the Si/Al mole ratio of the zeolite is about 1 to about 5.

14. The process for preparing a carbon dioxide adsorbent of claim 8, wherein, the strong base having the alkali metal ion or alkaline earth metal ion comprises KOH, NaOH, LiOH, $Mg(OH)_2$, $Ca(OH)_2$, $Ba(OH)_2$, or a combination thereof.

15. The process for preparing a carbon dioxide adsorbent of claim 8, wherein the hydrothermal treatment is conducted at a temperature of greater than or equal to about 80° C. for a period of time of about 30 hours or longer.

16. A method of separating carbon dioxide, comprising
    contacting a carbon dioxide adsorbent including a chabazite zeolite with an input gas stream containing carbon dioxide, the chabazite zeolite containing an alkali metal ion or alkaline earth metal ion, the chabazite zeolite having a Si/Al mole ratio of about 1 to about 9.9, the chabazite zeolite having mesopores.

17. The method of claim 16, wherein the alkali metal ion or alkaline earth metal ion comprises lithium (Li) ion, sodium (Na) ion, potassium (K) ion, barium (Ba) ion, magnesium (Mg) ion, calcium (Ca) ion, or a combination thereof.

18. The method of claim 16, wherein the Si/Al mole ratio ranges from about 1 to about 5.

19. The method of claim 16, wherein the chabazite zeolite has a volume of mesopores of about 0.05 to about 0.50 $cm^3/g$ as measured by the Barrett-Joyner-Halenda (BJH) method.

20. The method of claim 16, further comprising:
    heat-treating the carbon dioxide adsorbent at a temperature of about 200° C. to about 500° C., optionally under a reduced pressure, to desorb the carbon dioxide.

* * * * *